United States Patent [19]

Thatte et al.

[11] Patent Number: 4,695,949
[45] Date of Patent: Sep. 22, 1987

[54] METHOD FOR EFFICIENT SUPPORT FOR REFERENCE COUNTING

[75] Inventors: Satish Thatte, Richardson; Donald W. Oxley, Carrollton, both of Tex.

[73] Assignee: Texas Instruments Incorporated, Dallas, Tex.

[21] Appl. No.: 632,564

[22] Filed: Jul. 19, 1984

[51] Int. Cl.[4] ............................................. G06F 12/02
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,131,949 | 12/1978 | Fletcher et al. | 364/900 |
| 4,149,240 | 4/1979 | Misunas et al. | 364/200 |
| 4,447,875 | 5/1984 | Bolton et al. | 364/200 |
| 4,502,118 | 2/1985 | Hagenmaier | 364/200 |
| 4,510,565 | 4/1985 | Dummermuth | 364/900 |

OTHER PUBLICATIONS

Knuth, "Fundamental Algorithms", vol. 1, Second Edition, Addison Wesley, 1973, pp. 412–413.

*Primary Examiner*—David Y. Eng

*Attorney, Agent, or Firm*—Kenneth C. Hill; James T. Comfort; Melvin Sharp

[57] ABSTRACT

A method and apparatus for managing a block oriented memory of the type in which each memory block has an associated reference count representing the number of pointers to it from other memory blocks and itself. Efficient and cost-effective implementation of reference counting alleviates the need for frequent garbage collection, which is an expensive operation. The apparatus includes a hash table into which the virtual addresses of blocks of memory which equal zero are maintained. When the reference count of a block increases from zero, its virtual address is removed from the table. When the reference count of a block decreases to zero, its virtual address is inserted into the table. When the table is full, a reconciliation operation is performed to identify those addresses which are contained in a set of binding registers associated with the CPU, and any address not contained in the binding registers are evacuated into a garbage buffer for subsequent garbage collection operations. The apparatus can be implemented by a cache augmented by the hash table, providing a back-up store for the cache.

2 Claims, 7 Drawing Figures

METHOD FOR EFFICIENT SUPPORT FOR REFERENCE COUNTING

BACKGROUND OF THE INVENTION

1. Field of the Invention

This invention relates to computer memory systems, and more particularly to improvements in methods and apparatus for managing block oriented memory systems (as defined below), and still more particularly to improvements in methods and apparatuses for managing reference counts of block oriented memory systems employing reference counts in memory management.

2. Background Information

Reference counting is an important memory management technique for rapid reclamation of inaccessible memory. Efficient and cost-effective implementation of reference counting will alleviate the need for frequent garbage collection, which is an expensive operation. Reference counting has been known since about 1960. See, for example, Collins, G. E., "A method for overlapping erasure of lists," Communications of the ACM, Vol. 3, No. 12, 1960, pp. 655–657, and has undergone many refinements, see, for instance, Knuth, D., The Art of Computer Programming, Addison-Wesley, Reading, Mass., 1973, and Standish, T. A., Data Structure Techniques, Addison-Wesley, Reading, Mass., 1980.

The basic idea is to maintain a count of the number of pointers that reference each block of memory. If the reference count of a block should fall to zero, the block is no longer accessible, i.e., it is garbage, and its space can be reclaimed and reused. After a block becomes garbage, it is scanned to decrement reference counts of the referent blocks it references. Then the block is cleaned-up (i.e., initialized), and its space is made available for reuse. Examples of computer systems employing the reference counting technique are, the Xerox-Dorado Smalltalk-80 system described by Goldberg and Robson, "Smalltalk-80: The Language and its Implementation," Addison-Wesley, Reading, Mass., 1983, and LOOM, Kaehler and Krasner, LOOM-Large Object-Oriented Memory for Smalltalk-80 Systems, in Smalltalk-80: Bits of History, Words of Advice, Addison-Wesley, Reading, Mass., 1983, p. 249, and Stamos, "A large object-oriented virtual memory: Grouping strategies, measurements, and performance," Xerox Technical Report, SCG-82-2, Xerox Palo Alto Research Center, Palo Alto, CA, May 1982.

Reference counting provides a mechanism of rapid reclamation of memory space. It also provides the percentage utilization of memory, as well as, and portions of memory, such as each memory page. This information is very important in many applications; for example, it is used in certain garbage collection and compacting schemes, such as that disclosed in U.S. Patent application by T. McEntee et al. entitled "Method for Managing Virtual Memory to Separate Active and Stable Memory Blocks", Ser. No. 634,334, filed July 24, 1984, now allowed, said application being assigned to the assignee hereof, and incorporated herein by reference. Thus, not only is a reference counting scheme important for the memory compactor, reference counting also provides a cross-check for garbage collection, and is expected to help the design of robust memory management and aid in error recovery.

Reference is also made to U.S. patent application by Thatte et al., entitled "Computer System Enabling Automatic Memory Management Operations", Ser. No. 630,478, filed July 12, 1984, pending. This application is assigned to the assignee hereof, and is incorporated herein by reference. This application discloses a computer system having an associated memory which has a memory management unit (MMU) to perform the memory management functions. In the MMU, there are two sources of references for memory blocks; the first one is binding registers (to which the memory blocks may be bound, as disclosed in said applications) and the second one is memory cells of other or the same block. The reference count of a block in these systems is therefore the sum of the number of pointers originating at binding registers and the number of pointers originating at memory cells.

Thus, for example, with reference to FIG. 1, an example of the reference count structure of the Thatte et al. application is shown. As shown, a number of binding registers 10 associated with a CPU 12 reference blocks in an associated memory. In the case shown, blocks 14 and 16 are referenced. Additionally, the blocks of memory may reference themselves or other blocks. Thus as shown, block 14 references both block 15 and block 16, and block 15 refers to itself. Also, one of the binding registers 10 refers to block 14, and two of the binding registers 10 refer to the block 16. The reference counts of each of the blocks, therefore, can be seen to be, block 14=1; block 15=2; and block 16=3.

The reference count of a block can change as a result of writing new data in a binding register or a memory cell. The new data may destroy an existing pointer in a binding register or a memory cell, which will result in a decrease of the reference count of the referent block by one; moreover, the new data may itself be a pointer, which when written will result in an increase of the reference count of the referent block by one.

Reference counting does have certain disadvantages which should be considered. In general, reference count operations cannot reclaim garbage blocks in a circular pointer structure; hence, garbage collection is necessary. This is an intrinsic and unavoidable problem with reference counting, and is not addressed by the invention herein. Additionally, counting references takes time. For each instruction that writes new data in a binding register or in a memory cell, the existing contents of the binding register or the memory cell must first be read to determine whether a pointer will be destroyed, as a result of writing new data. In the machine of the above mentioned application, Ser. No. 630,478, if the MMU tag of the existing contents indicates a pointer, then obviously a pointer will be destroyed. If an existing pointer is destroyed, then the header of the referent block must be read to retrieve the reference count, the reference count is decremented by one, and finally the updated reference count is stored back in the header of the referent block. Thus, for example, in FIG. 2, when data is written into a cell of a block 20 which previously contained a pointer, the pointer will be destroyed. The reference count of the referent block 21 (also referred to by a pointer of a block 22) will be decremented from "2" to "1", since now only block 22 refers to it.

Similarly the new data being written must also be checked to see if it is a pointer. In the machine of the aforementioned patent application Ser. No. 630,478 this is determined by inspecting the MMU tag of new data. If the data is a pointer, then a new pointer will be created, which requires that the header of the referent block must be read to retrieve the reference count, the reference count is incremented by one, and finally the updated reference count is stored back in the header of the referent block. This is illustrated in FIG. 3 in which a new pointer is written into a cell of a block 30 which thereafter points to block 31. Block 31 previously was referenced only by block 32, and its reference count was "1". After the new pointer is written into block 30, the reference count will need to be incremented to be "2".

As described above, the reference management is a time consuming operation. Unger quotes private communication with Deutsch, as cited in Unger, D., "Generational scavanging: A nondisruptive high performance storage reclamation algorithm," Proceedings of the ACM SIGSOFT/SIGPLAN Software Development Environments, Pittsburgh, PA, April, 1984, pp. 157-167, and his own work set forth in Unger and Patterson, "Berkeley Smalltalk: Who knows where the time goes?", in Smalltalk-80: Bits of History, Word of Advice, Addison-Wesley, Reading, Mass., 1983, p. 189, to report that reference count management consumes 15 percent of CPU time, assuming that the CPU is responsible for reference count management. When the reference count of a block reaches zero, it must be scanned to decrement the reference counts of all referent blocks it references. This recursive freeing consumes an additional 5 percent of CPU time, according to Deutsch, L. P., Storage reclamation, Berkeley Smalltalk seminar, Feb. 5, 1982, and Unger and Patterson, supra. Thus, the total overhead of reference counting is about 20 percent of CPU time, assuming that the CPU is responsible for reference count management. This is an unacceptable overhead as fully one-fifth of the CPU time is "wasted" in reference count management. In the absence of efficient techniques to implement reference counting, not many machines have embraced the technique in practice, though the literature abounds with reference counting schemes and their uses.

Reference counting is a memory management function, and hence, in the machines of the aforementioned patent application, Ser. No. 630,478 is implemented by the MMU. Therefore, the overhead experienced by the CPU for reference count management is reduced; however, the CPU is not completely relieved from the reference counting overhead, as presently described.

For each instruction that writes new data in a binding register, the CPU needs to check if an existing pointer is being destroyed or a new pointer is being created, and then notify the MMU accordingly so that the MMU can update the reference count appropriately. The CPU must read the existing contents of a binding register before it can be written with new data, and must dispatch on the MMU tag of the existing contents to determine whether it is a pointer. Similarly, it must also dispatch on the MMU tag of the new data to determine whether a new pointer will be created.

When an existing pointer in a binding register is destroyed, the CPU needs to send a "(Destroyed-pointer Virtual-address)" notification to the MMU so that the MMU can decrement the reference count of the referent block residing at the virtual address, specified by the Destroyed-pointer command. Similarly, when a new pointer in a binding register is created, the CPU needs to send a "(Created-pointer Virtual-address)" notification to the MMU so that the MMU can increment the reference count of the referent block residing at the virtual address. All these operations make a simple WRITE instruction on a binding register very time consuming (4 to 6 cycles), complicate the CPU microcode design, and adversely affect the performance.

"Destroyed-pointer" and "Created-pointer" notifications result into interruptions of the current task of the MMU, and hog the bandwidth of the CPU-MMU interface, degrading performance. As will become apparent, the purpose of the invention is to reduce the CPU overhead for reference count management as much as possible.

It has been recognized that the CPU overhead of detecting the creation and destruction of pointers in binding registers, and then notifying the MMU about these events, can be reduced, by not counting references originating from binding registers in the reference counts. By not counting the binding register references, the reference count of a block indicates only the number of pointers originating at memory cells.

Another beneficial consequence of not counting binding register references is that a large share of reference count activity of incrementing and decrementing reference counts arising from creation and destruction of pointers in binding registers is reduced. It has also been recognized that the manner by which the reference counts of the binding registers are maintained must be carefully implemented. For instance, when the reference count of a block drops to zero, the MMU must inquire of the CPU whether any binding register is still holding a pointer to the block by sending the virtual address of the block to the CPU. The CPU must respond to this querry interruption by interrogating each of its binding registers, and indicate to the MMU whether or not any binding register is holding the virtual address sent by the querry. This interrogation is a time consuming sequential operation unless supported by very expensive parallel associative-search hardware.

If the outcome of the interrogation is negative, i.e., no binding register holds the pointer, then the MMU knows that the block is garbage and it reclaims it and makes it ready for reuse. On the other hand, if the interrogation indicates that there is a binding register holding the pointer, then obviously the block is not garbage. At some later time, the MMU, therefore, must resubmit the querry to the CPU to find out whether any binding registers still hold the pointer to the block. These frequent querry operations to the CPU result in a performance degradation.

Thus, this "solution" of frequently interrupting the CPU is querry whether any binding register is holding a pointer to a block whose reference count has dropped to zero is undesirable.

BRIEF DESCRIPTION OF THE DRAWING

The invention is illustrated in the accommpanying drawing, in which.

In the various figures of the drawing, like reference numerals are used to denote like or similar parts.

SUMMARY OF THE INVENTION

In light of the above, it is an object of the invention to provide a memory management technique for rapid reclamation of inaccessible memory.

It is another object of the invention to provide a memory management technique of the type described which is efficient, cost-effictive, alleviates the need for frequent garbage collection, reduces the reference counting overhead, and allows reference counting to be implemented in practice.

It is another object of the invention to provide a memory management technique of the type described which reduces the expense and overhead heretofore required to perform reference counting, without adversely affecting the performance of the memory system within which it is employed.

These and other objects, features, and advantages will become apparent to those skilled in the art from the following detailed description when read in conjunction with the accompanying drawings and appended claims.

In accordance with a broad aspect of the invention, an apparatus is provided for managing a block oriented memory of the type in which each memory block has an associated reference count representing the number of pointers to it from other memory blocks and itself. The apparatus includes means for implementing a data structure storing virtual addresses, which can be implemented by a hash table or the like. Means are also provided for performing insert and delete operations on the data structure, means for inserting in the data structure the virtual address of each block of memory which has a reference count of zero, and means for deleting from the data structure the virtual address of each block of memory whose reference count changes from zero to one. In one aspect of the invention, the apparatus further includes means for performing a reconciliation operation on the data structure when it is full, the reconciliation means including means for obtaining a dump of pointers in binding registers, means for comparing the pointers of the pointer dump with the virtual addresses contained in the data structure, and means for deleting any virtual addresses contained in the data structure not in the pointer dump.

DETAILED DESCRIPTION OF THE PREFERRED EMBODIMENTS

Figure 1:
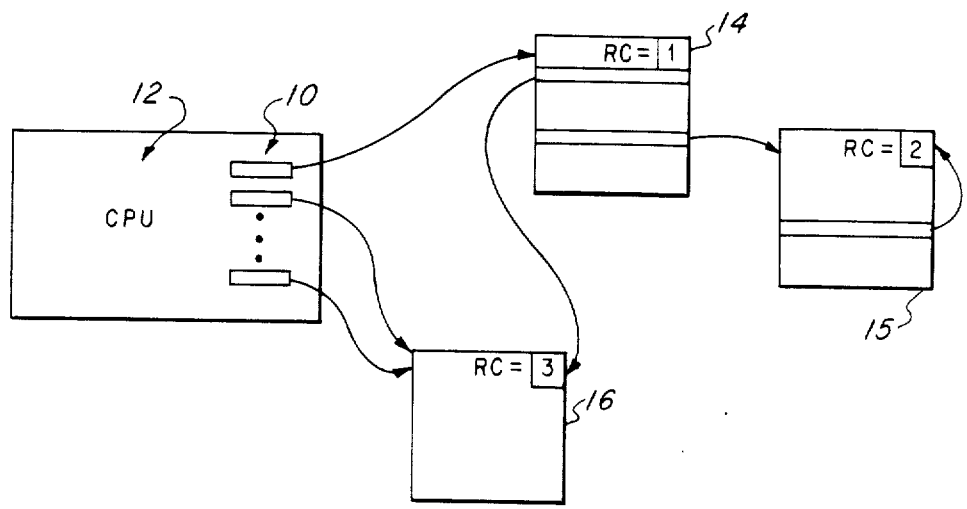
FIG. 1 is a block diagram of the manner in which reference counts operate in conjunction with pointers of binding registers and other memory blocks, in accordance with a block oriented computer memory system with which the method and apparatus of the invention operates.
Figure 2:
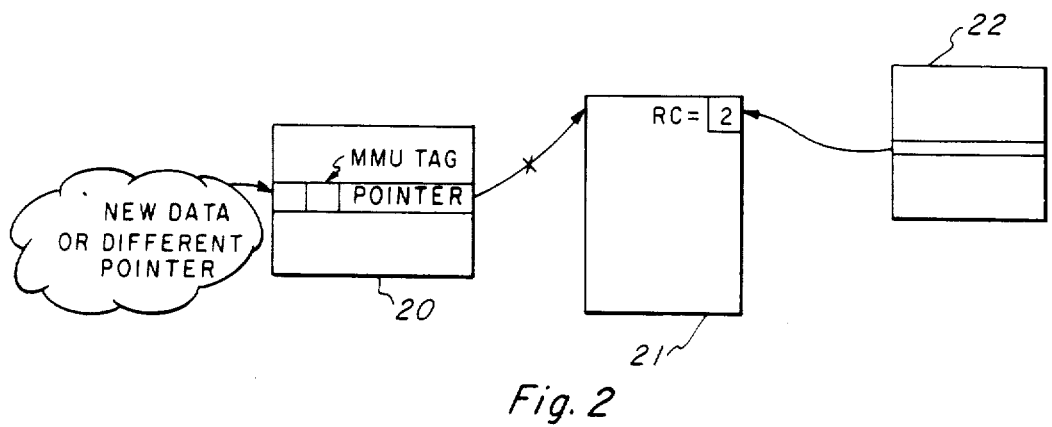
FIG. 2 is a block diagram illustrating the manner by which the reference count of a block is decreased when a pointer to the block is destroyed, in accordance with the computer system described with reference to FIG. 1.
Figure 3:
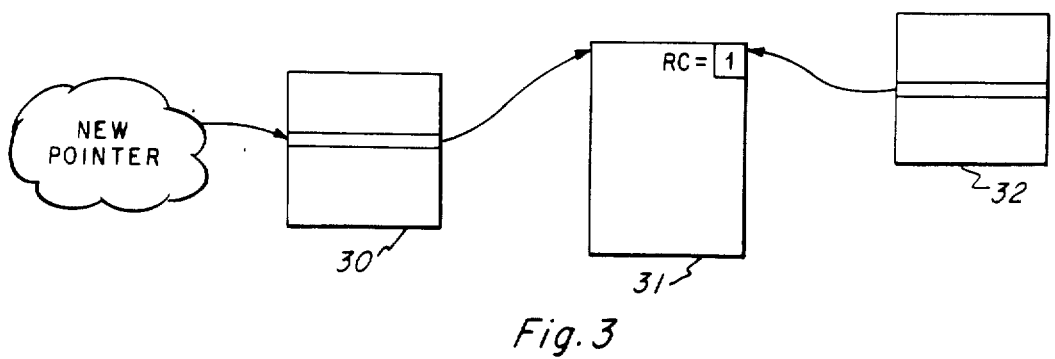
FIG. 3 is a block diagram illustrating the manner by which the reference count of a block is incremented when a pointer to the block is created, in accordance with the computer system described with reference to FIG. 1.
Figure 4:
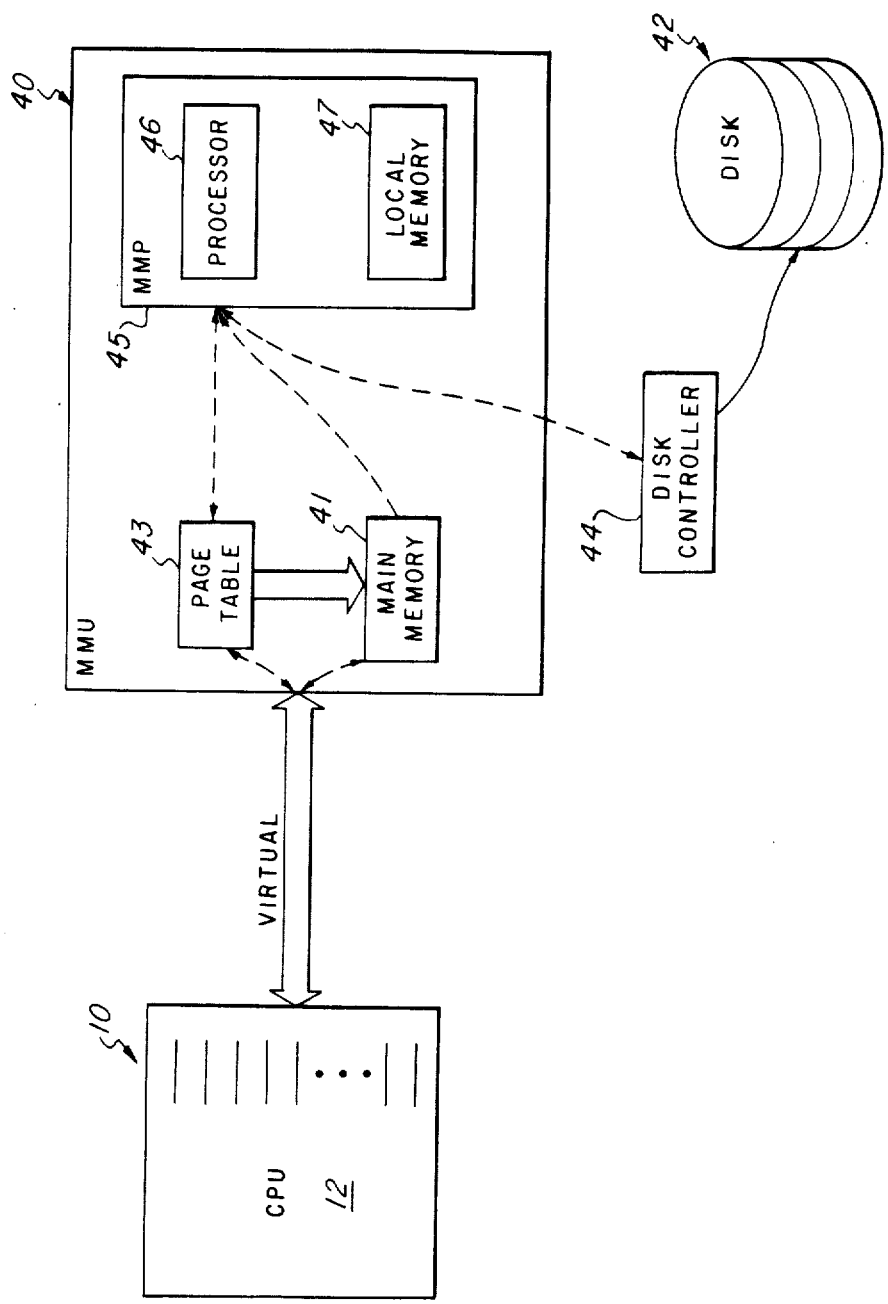
FIG. 4 is a block diagram of a computer system of the type with which the method and apparatus of the invention can be used.

The method and apparatus for reference count management assistance, herein referred to as a "reference count filter", acts conceptually as a filter to control reference count management. The method exploits two key features of memory systems, such as those described above with particular reference to copending application Ser. No. 630,478. In said application, with reference now to FIG. 4, a CPU 12 having a plurality of binding registers 10 is provided. A separate memory management unit (MMU) 40 is provided for memory management functions associated with a main memory 41 and disk 42, which serves as a back-up store to the main memory 41. A page table 43 translates virtual addresses to physical memory addresses, and a disk controller 44 controls the disk operation in its main memory back-up function. The page table 43, main memory 41, disk controller 44 and disk unit 42 are controlled by a memory management processor (MMP) 45, all as described in said copending patent application, Ser. No. 630,478. The MMP 45 has a processor 46 and a local memory 47 associated with it. The local memory 47 stores programs and data for use by the processor 46 in performing the MMP function. The data structure for the reference count filter, in accordance with the invention, as will become apparent from the description below, is implemented in the local memory 47 of the MMP 45.

More particularly, two features of interest are: (1) that the MMU 40 is responsible for reference count management; that is, it increments and decrements reference counts of the referent blocks, when pointers to these blocks are created or destroyed in memory cells. The MMU 40 is also responsible for reclaiming inaccessible blocks. And (2) that references originating from binding registers are not counted in the reference counts, that is, the reference count of a block indicates only the number of pointers originating at memory cells.

The MMU 40 maintains information about blocks which have zero reference counts, but which may have pointers to them originating at the binding registers. This information is conveniently recorded and maintained in a data structure, below described, in the form of virtual-addresses of such blocks. The reference count filter, in accordance with the invention, is a mechanism for efficiently maintaining such information. As described below, the reference count filter reduces the CPU overhead for reference count management, and eliminates the querry traffic, described earlier, from the MMU to the CPU.

Figure 5:
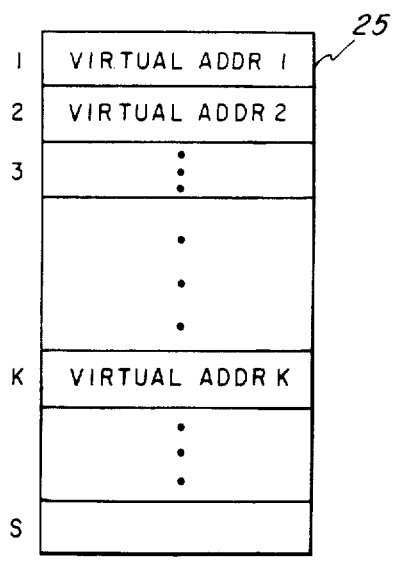
FIG. 5 is a conceptual diagram of an reference count filter for containing the virtual addresses of blocks whose reference counts are zero, in accordance with the invention.

The reference count filter is implemented with appropriate data structure, and managed by software contained in the local memory 47 and running on the MMP. A conceptual diagram of the reference count filter structure of the invention is shown in FIG. 5. An reference count filter table 25 is provided in which the reference count filter stores virtual addresses of blocks whose reference counts have dropped to zero, but which may have pointers to them originating at binding registers. For reasons which will become apparent below, the size of the reference count filter (which decides the maximum number of pointers that can be stored in it) must be greater than the number of binding registers managed by the CPU. As will be described below, a relatively simple way to implement the reference count filter is by means of a hash table.

Figure 6:
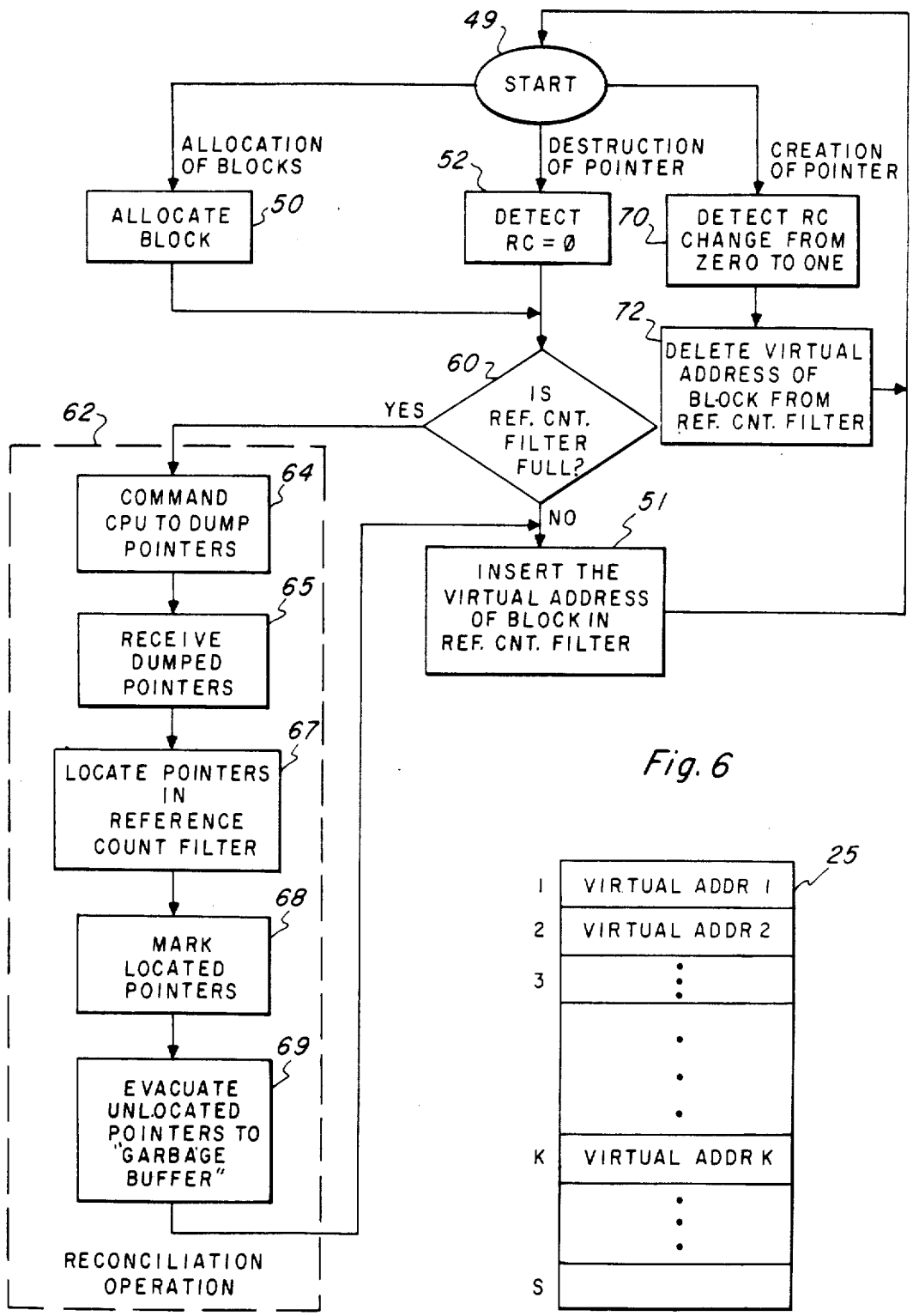
FIG. 6 is a block diagram showing the steps of maintaining the reference count filter for managing reference counts, in accordance with the invention.

The reference count filter in accordance with the invention operates in association with the MMU which performs three operations on the reference count filter, Insert, Delete, and Reconcile. These operations are presently described, with reference now to FIG. 6.

Beginning from a start position 49, three possible block affecting operations may be performed. The first is the allocation of a block, the second is the destruction of a pointer to a block, and the third is the creation of a pointer to a block. Accordingly, when a new block is allocated by the MMU 40 in response to an "Allocate" command from the CPU 12, box 50, the new block starts its life with a zero reference count. Therefore, in accordance with the invention, the virtual address of a newly allocated block is inserted into the reference count filter 25, box 51, assuming that there is a place in the reference count filter for insertion, i.e., that the reference count filter is not full. Similarly, when the reference count of a block drops to zero, box 52, the virtual address of the block is inserted in the reference count filter 25, again assuming that there is a place in the reference count filter for inserion. The insert operation on the reference count filter is implemented by the insert operation on the underlying hash table, as below described.

If the reference count filter is determined to be full, box 60, the MMU suspends the insertion operation and performs a reconciliation operation, box 62, on the reference count filter, as described below, to create a room in the reference count filter so that the suspended insertion operation can be completed.

When the reference count of a block goes up from zero to one, box 70, the virtual address of the block is deleted from the reference count filter, box 72. The deletion operation is necessary because a block with a non-zero reference count must not stay in the reference count filter. To accomplish the deletion, first the virtual address of the block with non-zero reference count (which is guaranteed to exist in the reference count filter) is searched for in the reference count filter, and then it is deleted. The delete operation on the reference count filter is implemented by the delete operation on the underlying hash table implementing the reference count filter, again as below described.

As mentioned above, after an insert operation is suspended due to a full reference count filter, the MMU needs to make a room in the reference count filter so that the suspended insert operation can be resumed and completed. The MMU 40 makes the necessary room by performing a reconciliation operation, box 62. It sends a special command to the CPU 12 called "Dump-pointers," box 64. In response, the CPU 12 sends the contents of all binding registers that contain pointers (which are virtual addresses) to the MMU. The set of these pointers is called the "Dumped-out" set, which is received by the MMU, box 65. The pointers in the Dumped-out set indicate the block which have references originating at binding registers. Of course, the size of the dumped-out set cannot exceed the number of binding registers. The reconciliation operation is guaranteed to created a room in the reference count filter, as the size of the reference count filter is greater than the number of binding registers. Therefore, there must be at least one virtual address in the reference count filter which is not in any binding register.

The MMU reconciles the state of the reference count filter with the set of Dumped-out pointers, by executing the following operations. (1) Each pointer from the dumped-out set is attempted to be located by the MMU within the virtual address contained in the reference count filter, box 67. If the pointer exists in the reference count filter, the MMU marks the pointer in the reference count filter, box 68. The pointers in the reference count filter, thus marked, indicate blocks that are still accessible and hence are not garbage. All unmarked pointers in the reference count filter, therefore, indicate garbage blocks. (2) The unmarked pointers are evacuated from the reference count filter and stored in another data structure, called the "garbage buffer" (not shown), box 69, which essentially holds pointers to garbage blocks. A background process not described herein in the MMU operates on the garbage buffer to reclaim the garbage blocks. As soon as the unmarked pointers are evacuated from the reference count filter to the garbage buffer, the reconciliation operation on the reference count filter is over, and the regular operation is resumed. As a result of the reconciliation operation, the state of the reference count filter has been reconciled with the state of binding registers, and pointers to all garbage blocks have been evacuated from the reference count filter.

It should be noted that the CPU is stopped during the reconciliation operation. Since this may result in performance degradation, it is desirable to reduce the time for reconciliation as much as possible.

Once a pointer is inserted in the reference count filter, it stays there until it is deleted either by the next delete operation, or is evacuated by the next reconciliation operation if it is not held by any binding register.

Thus, it can be seen that when the reference count of a block drops to zero, the virtual address of the block is simply stored in the reference count filter, and no querry need be sent to the CPU. Similarly, when the reference count of the block goes up from zero to one, its virtual address is simply deleted from the reference count filter, and no querry need be sent to the CPU. Therefore, the reference count filter eliminates the querry traffic to the CPU described above. Since the references from binding registers are not counted, a large share of reference count activity is eliminated, reducing the reference count overhead.

The preferred implementation of the reference count filter is a hash table that can efficiently support the insert, delete, and reconcile operations. Therefore, the basic search operation on the hash table must be quite fast. The performance of the hash table can be improved, if it is augmented with a cache. The hash table then will act as a back-up store for the cache. A search operation on the cache can be performed in a single cycle (if there is a cache hit), while a search on the hash table may take about ten cycles.

Figure 7:
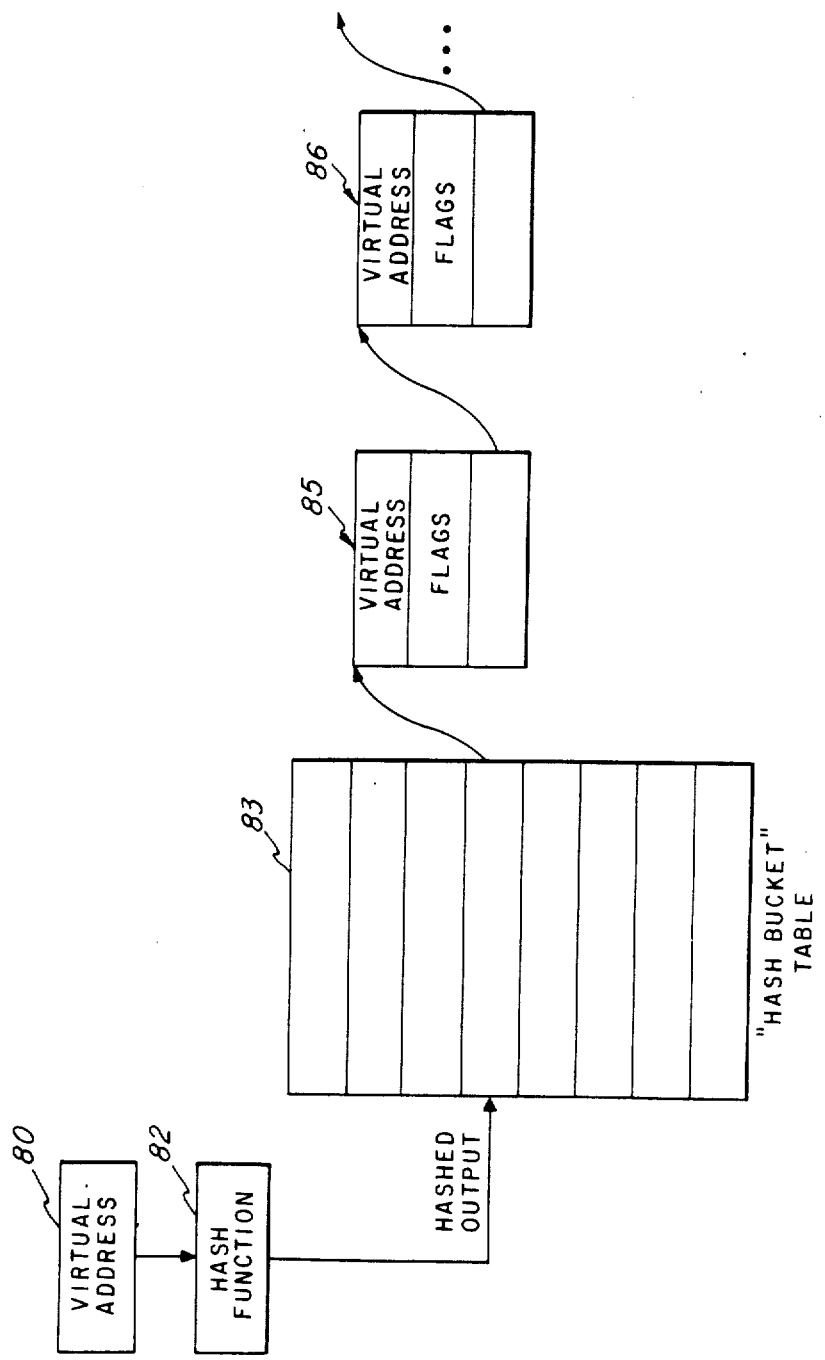
FIG. 7 is a block diagram showing an implementation of a hash table in implementing the reference count filter in accordance with the invention.

The hash table implementation of the reference count filter, in accordance with the invention, is illustrated in FIG. 7. As shown, a virtual address, shown in block 80, is applied to means for implementing a hash function, shown in block 82. Hash function implementing functions are well known in the art, and are not described in detail herein. The hashed output from the hash function is applied as an address to a "hash bucket" table 83, in which a corresponding entry is located. The located entry may be a pointer which may point to a linked list 85, 86, etc. of virtual addresses. If the virtual address searched for (i.e. the virtual address contained in block 80) is in the linked list 85, 86, etc., the "locate" operation is successful.

The size of the hash bucket table 83 is 4 to 6 times the size of the reference count filter. This gives an 18 to 25 percent load factor, giving an acceptably low collision ration and good hash table performance. In addition, as described above, the reference count filter must be larger than the number of binding registers. The question is "how much larger?" The size of the reference count filter, the average frequency of reconciliation operations (indicated by the average number of memory cycles between successive reconciliation operations), the performance degradation due to reconciliation operations, and the average time latency between a block becoming garbage and it getting reclaimed, are closely related, and there are trade-offs involved between these related issues.

More specifically, the larger the size of the reference count filter, the higher the cost of implementing the reference count filter. The lower the rate of reconciliation operations, the higher the time for reconciliation operation, and the higher the time latency between a block becoming garbage and it getting reclaimed. A lower rate of reconciliation operations reduces the rate of CPU interruptions necessary to reconcile the reference count filter state with state of binding registers. Therefore, a lower rate of reconciliation is desired. A higher time for reconciliation operation obviously makes reconciliation a slower operation. A higher latency between a block becoming garbage and it getting reclaimed means a larger percentage of memory remains idle. Therefore, lower latency is desired.

Let.

Fa = average frequency of block allocation operations (indicated by the average number of memory cycles between successive "Allocate" commands from the CPU).

Ft−1−0 = average frequency of occurrences of the event corresponding to the reference count of blocks going down from one to zero, (indicated by the average number of memory cycles between successive events of this type).

Fi = average frequency of insertion operations on the reference count filter (indicated by the average number of memory cycles between successive insertions).

Then, $$1/Fi = 1/Fa + 1/Ft-1-0.$$

Therefore, $$Fi = (Fa*Ft-1-0)/(Fa+Ft-1-0)$$

Let,

Fd = average frequency of deletion operations on the reference count filter (indicated by the average number of memory cycles between successive deletions).

Ft−0−1 = average frequency of occurrences of the event corresponding to the reference count of blocks going up from zero to one, (indicated by the average number of memory cycles between successive events of this type).

Then, $$Fd = Ft-1-0.$$

Let, b = number of binding registers.

s = size of the reference count filter (s > b).

k1 = number of memory cycles required to locate and mark a pointer from the Dumped-out set in the reference count filter.

k2 = number of memory cycles required to evacuate an unmarked pointer from the reference count filter to the garbage-buffer.

Therefore,

Tr = number of memory cycles for a reconciliation operation = k1*b + k2*s.

In the steady state, Ft−1−0 = Ft−0−1, and average frequency of reconciliation operations, Fr, must match the product of the size of the reference count filter, s, and the average frequency of block allocations, Fa. Thus, $$Fr = s*Fa.$$

Therefore,

Pd = percentage of performance degradation due to reconciliation =

$$\frac{Tr}{Fr + Tr} \times 100\% = \frac{k1*b + k2*s}{s*Fa + k1*b + k2*s} \times 100\%$$

Typically, b = 32, k1 = 10, k2 = 8. Table 1 gives the projected performance model for the reference count filter for these typical parameters.

Table 1

| | Percentage performance degradation due to reconciliations | |
|---|---|---|
| | Frequency of allocation, Fa | |
| s | 1,000 (high rate) | 5,000 (Moderate rate) |
| 64 | 1.2 | 0.26 |
| 128 | 1.0 | 0.21 |
| 256 | 0.9 | 0.18 |

The table indicates that for moderate to high allocation rates, an reference count filter of size = 128 is capable of reducing the performance degradation below one percent, which is a very encouraging result. An reference count filter of size = 128 has four times as many entries as the number of binding registers assumed in this example. Note that this example assumes a totally software-managed reference count filter, implemented as a hash table. With more sophisticated implementations and possible hardware support (such as a cache), the degradation can be reduced by an order of magnitude.

Although the invention has been described and illustrated with a certain degree of particularity, it is understood that the present disclosure has been made by way of example only and that numerous changes in the arrangement and combination of parts and the steps of the method described can be resorted to by those skilled in the art without departing from the spirit and the scope of the invention as hereinafter claimed.

We claim:

1. Apparatus for identifying garbage blocks in a block oriented memory of the type in which each memory block has an associated reference count representing a number of pointers to it from other memory blocks and itself, but not including pointers from a CPU, comprising:

means for creating a data structure for containing pointers to blocks of memory;

means for inserting in the data structure a pointer to each block of memory which has a reference count of zero;

means for deleting from the data structure the pointer to each block of memory whose reference count changes from zero;

means for comparing pointers in the CPU with the pointers in the data structure;

means for marking memory blocks which are in the data structure and not pointed to by the CPU as garbage blocks; and means for moving the pointers to memory blocks marked as garbage blocks from the data structure to a garbage buffer.

2. A method for managing a block oriented memory of the type in which each memory block has an associated reference count representing a number of pointers to it from at least memory blocks and itself, but not from a CPU comprising:

storing a first list of pointers to memory blocks which have a reference count of zero;

inserting into such list a pointer to each block of memory which has a reference count which changes to zero;

deleting from such list the pointer of each block of memory whose reference count changes from zero;

identifying the blocks which have pointers in the list as potential garbage blocks; and when the list of pointers reaches a preselected size, obtaining a second list of pointers contained in the CPU, deleting from the first list those pointers which are not contained in the second list, and returning the memory blocks having pointers deleted from the first list to the system for reuse.

* * * * *